F. TRINCA.
AUTOMOBILE BODY CONSTRUCTION.
APPLICATION FILED AUG. 20, 1919.
1,365,211.
Patented Jan. 11, 1921.
2 SHEETS—SHEET 1.
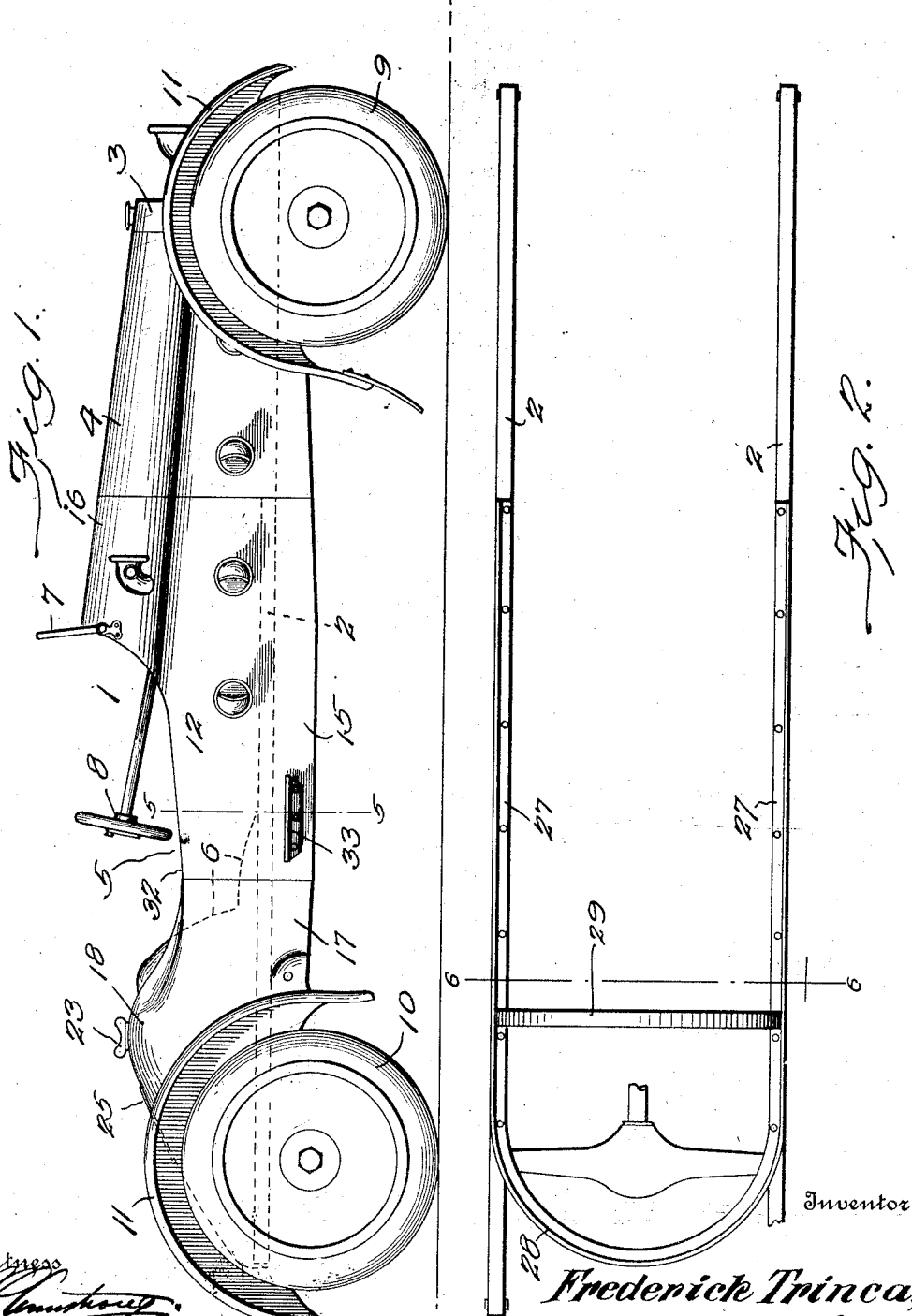
Inventor
Frederick Trinca,
By C. C. Hines,
Attorney.

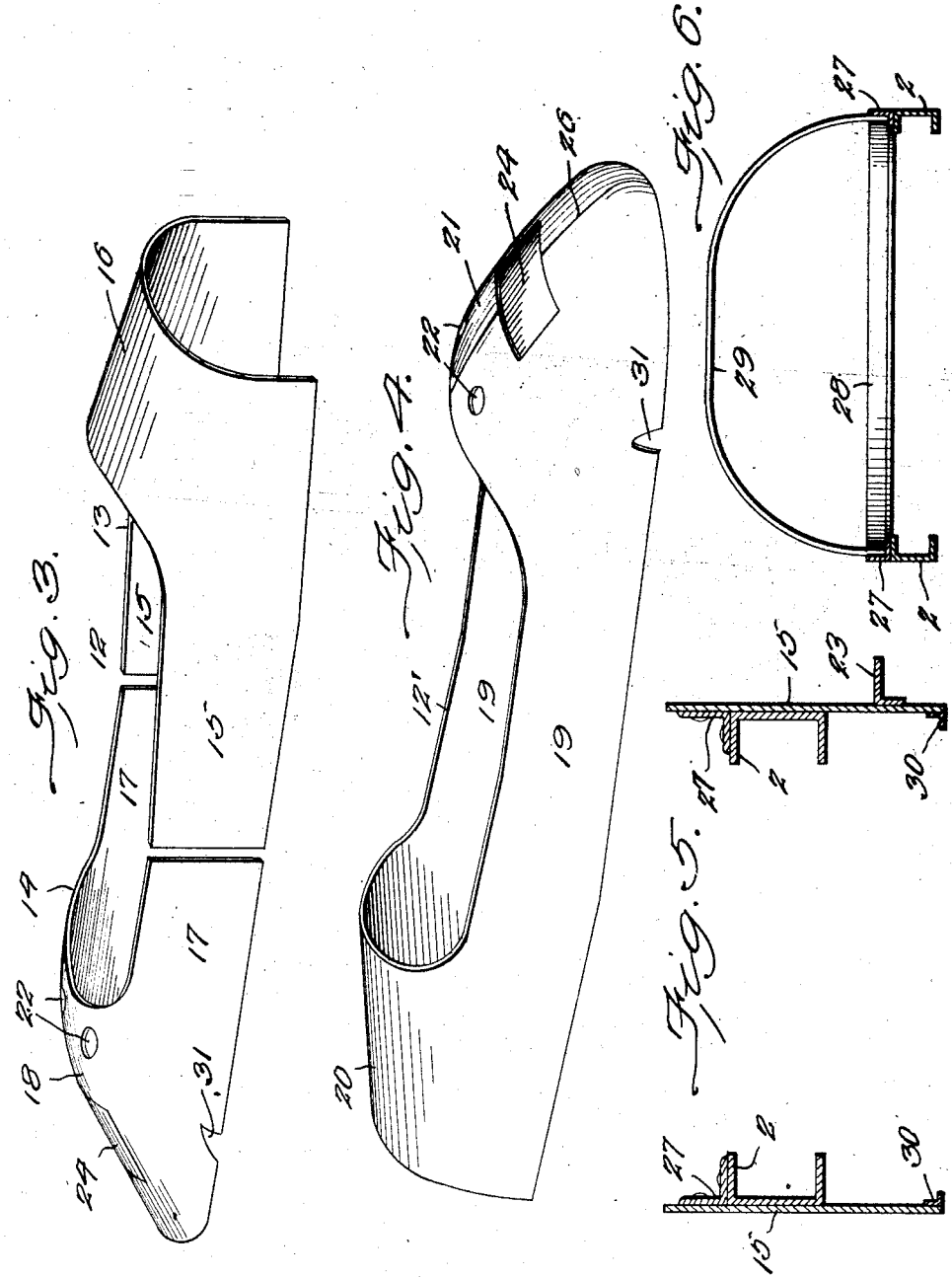

UNITED STATES PATENT OFFICE.

FREDERICK TRINCA, OF WEST NEW YORK, NEW JERSEY, ASSIGNOR OF ONE-HALF TO ANTHONY C. VELO, OF NEW YORK, N. Y.

AUTOMOBILE-BODY CONSTRUCTION.

1,365,211.　　　　　Specification of Letters Patent.　　Patented Jan. 11, 1921.

Application filed August 20, 1919. Serial No. 318,679.

*To all whom it may concern:*

Be it known that I, FREDERICK TRINCA, a citizen of the United States of America, residing at West New York, in the county of Hudson, State of New Jersey, have invented certain new and useful Improvements in Automobile-Body Constructions, of which the following is a specification.

This invention relates to improvements in automobiles, and particularly to automobile bodies.

In automobiles of ordinary construction, it is common to support the body by superposing the latter upon the chassis. This raises the height of the body to the extent that the usual form of running board is necessary. It is also necessary that the bodies be constructed of several pieces and that they necessarily be provided with door openings and doors of the well known type.

The present invention provides an automobile body which has its sides arranged to overlap the sides of the chassis frame and extending from above to a point below the sides of the chassis frame, and the gist of the invention consists in disposing the body so that it embraces the chassis and in providing the body with brackets or supporting members which act as hangers for suspending the body from the chassis. These hanger brackets or members are located at a point between the upper and lower edges of the body and on the inner faces thereof and effecting, in conjunction with adjacent portions of the chassis frame, a reinforcement to the body throughout a major intermediate length of the opposite sides thereof. This lowers the base of the body, and, while producing a body of cheap construction, in that it can be formed of either one or two pieces of material (a single piece if desired), it so lowers the upper portion of the body that a tread member or step, arranged at one side of the body, provides ample means to permit the driver to step in and out of the car. Such construction also permits door openings and doors to be dispensed with, if desired, and the center of gravity of the car to be desirably lowered, while at the same time it produces a low-set body which is graceful and attractive and high-priced in appearance, but of low cost in fact, in view of the novel features involved.

The invention consists in the general features of construction, combination and arrangement of parts hereinafter fully described and claimed, reference being had to the accompanying drawings, in which:

Figure 1 is a side-elevation of an automobile embodying my improved style of body, showing in the present instance the application of the invention to an automobile of the roadster type.

Fig. 2 is a top plan view of the side bars of the chassis and the suspended bracket members and coacting bracing elements for the body.

Fig. 3 is a perspective view of the body *per se*, as when constructed of two pieces of material, Fig. 4 is a similar view of the body *per se*, as when constructed of a single piece of material, Fig. 5 is a vertical transverse section, on line 5—5 of Fig. 1, through the body and side bars of the chassis, Fig. 6 is a similar view taken on the line 6—6 of Fig. 2.

Referring to the drawings, 1 designates generally an automobile of the roadster type, to which my invention is shown in the present instance applied and which, with the exception of the body portion may be of any ordinary or preferred construction. The side bars of the chassis or frame of this vehicle are indicated at 2, the radiator at 3, the engine compartment hood at 4, the driver's compartment or cockpit at 5, the seat (or seats) and seat back (or backs) therein at 6, the windshield at 7, the steering post and wheel at 8, the front and rear supporting wheels at 9 and 10, respectively, and the wheel fenders at 11. These and the other component parts of the automobile may be of conventional type, although, if desired, the hood 12 may be varied in form and construction, to suit any specific variation in the design or configuration of the body, which may be made, to impart to the vehicle any desired distinctive or characteristic appearance.

In carrying my invention into practice, I provide a body structure, which as designated by 12 in Figs. 1 and 3, may be made of two pieces or sections of sheet metal or other suitable material, or which, as designated by 12′ in Fig. 4, may be made of a single piece of sheet metal or other suitable material. A characteristic feature of this body is that it surrounds or embraces the chassis and is suspended therefrom instead of being superposed upon, or resting thereon, as in automobiles of prior construction. The major intermediate portion of the opposite sides of the body are preferably vertically flat and thus extend above and below the chassis, thereby concealing the latter and all unsightly parts of the automobile driving mechanism and lowering the center of gravity of the machine to a desirable extent, as well as obtaining other important advantages, as hereinafter fully described.

In the construction shown in Figs. 1 and 3, I have shown a body, comprising a front or main section 13 and a back section 14, each of which is preferably formed of a single piece of sheet metal. The front or main section 13 consists of the side pieces or plates 15 connected at their forward ends by the arched cowl portion 16, while the back section 14 consists of the side pieces or plates 17 connected at their rear ends by the arched and sloping rear deck 18. When the said body sections 13 and 14 are assembled, the edges of the plates 15 and 17 abut and may be welded or otherwise suitably united. In the construction shown in Fig. 4, the body 12' is of the same form and general construction as that shown in Figs. 1 and 3, but is formed of a single piece of material, said body comprising continuous side pieces or plates 19 connected at their forward ends by the arched cowl portion 20 and at their rear ends by the arched and sloping rear deck portion 21. It will, of course, be understood, that the interior of the body may be lined, partitioned and upholstered in the usual or any preferred way and that in practice, the space covered by the rear deck may be partitioned to receive the gasolene supply tank and to form a storage compartment for luggage, etc. In the event that the gasolene tank is thus arranged at the rear, the rear deck may be provided with one or more openings 22 through which the tank may be filled, each opening having a closure 23. Also in the event that a tool or luggage compartment is formed as described, the rear deck may be provided with a door opening 24 closed by a suitable door or closure 25. In forming the body from a single piece of sheet material, there is necessarily a split or line of division at some point, and this may be arranged to come at the center of the rear deck 21, as indicated at 26, and the meeting edges of the portions of the joint may be welded or otherwise suitably united.

Brackets 27 are provided on the inner faces of the sides of the body for suspending the same from the side bars 2 of the chassis. These brackets are preferably in the form of angle iron bars or rails, extending entirely along the sides of the body and riveted or welded thereto to serve also as means for stiffening and reinforcing the same. These bracket bars rest flat upon the chassis bars 2 and continuously so throughout their length and at suitable intervals are bolted or riveted thereto. The chassis bars 2 are preferably of U-shaped angle iron, as shown in Fig. 5, or the same may have any other form to provide flat outer abutment faces flush or in alinement with the flat vertical faces of the brackets 27, against which the sides of the body may squarely bear in a manner to further strengthen and reinforce the depending flat side portions of the body. At the rear, the bracket bars are preferably united by a curved or U-shaped connecting portion 28, continuous therewith, which extends around and stiffens and reinforces the base portion of the rear deck 18 or 21 as the case may be. The rear ends of the bracket bars are also preferably connected by and support a vertical arched or U-shaped stiffening member 29 which extends under the upper forward portion and sides of the rear deck (18 or 21), and stiffens and reinforces the same at such point. Of course, I do not limit the invention to the means disclosed for suspending the body from the chassis, as any suitable means for this purpose may be employed, but that shown is preferred under ordinary conditions as providing a simple type of suspending means which also serves as a stiffening frame for the body, thereby enabling a strong body to be made from comparatively thin sheet material. If desired, the lower edges of the sides of the body may also be strengthened and reinforced by an angle metal stiffening piece 30. At the points where the curved portion of the base of the rear deck (18 or 21) joins the straight sides thereof, notches 31 are formed for the rearward extension and passage of the rear ends of the chassis bars 2, thus allowing the deck structure to fit down or depend to a desirable extent at the rear of the vehicle.

Preferably the upper edges of the sides of the body are cut away and curved or sloped downwardly and inwardly on converging lines from the cowl (16 or 20) and the deck (18 or 21), so as to make the sides of the body of a minimum height or elevation from the ground at or about the point 32, a short distance in rear of the transverse line of the steering wheel and at or near (as shown in the present instance) just in rear of the transverse center of the seat, while the sides of the body are substantially flat and depend an appreciable distance below the bars 2. By this means, the cockpit or driver's compartment is arranged at such a low position that a step or tread member 33 disposed upon a side of the body serves amply to permit the driver (and passenger, if any) to step in and out of the car. As a result, running boards and aprons may be dispensed with (as well as door openings and doors, when their use is not desired), whereby the body structure may be to a greater or less extent simplified and its cost of production decreased. Moreover, the elimination of running boards and aprons in particular, which break the line of continuity of the vehicle body as a whole at each side, and which interfere more or less with the general conformation of the sides of the vehicle along gracefully extending lines, admits of the longitudinal curvature or extension of the sides of the body along the chassis so as to secure a "long, low and rakish" or other desired effect. By dispensing with the usual running boards and aprons, which are in general of cumbersome appearance and unsightly, and forming the sides so as to present a pleasing line of curvature, and which, if desired, may be extended downward sufficiently to cover and conceal other unsightly parts of the car mechanism, it will be apparent that an extremely simple and yet graceful and attractive structure is produced, which is high-priced in appearance, but low-priced in fact in view of the novel construction and arrangement above specified. In the drawings, I have shown a car with a right-hand drive and, for simplification of illustration, have also shown the step or tread member 33, at the right-hand side of the body, but in practice, either a right-hand or a left-hand drive may be employed and the step 33 may be positioned at the same side of the car as the steering wheel or at the opposite side, or a step at each side may be provided if desired.

The body structure herein disclosed lends itself particularly to the construction of a novel and attractive type of roadster or sport car in which the floor of the car may be arranged at the level of the side bars of the chassis and wherein the seat and seat back may be disposed at a downward and forward sloping angle, the forward edge of the seat extending down to the floor line, so that the driver and passenger may assume a semi-reclining position, but such arrangement is not essential and may be varied as desired. The body structure may also be varied as desired within the spirit and scope of the invention as defined in the appended claims.

While for purpose of exemplification I have shown the application of my invention to a doorless roadster type of automobile, it is to be understood that the invention is not restricted thereto, as the essential and salient features thereof may be applied with equal advantage to other types of cars provided with doors, such as touring cars, limousines, sedans, etc.

Having thus described my invention, I claim:

1. In an automobile, a chassis having longitudinally extending side bars, a body embracing said chassis and having the lower edges of the opposite side walls thereof arranged exteriorly of and depending for a distance below the lower faces of said side bars, and reinforcing and supporting brackets extending longitudinally of the inner faces of the opposite side walls of said body and secured thereto, said brackets being secured to said chassis side bars and superposed thereon and extending throughout their length along the upper surfaces thereof, for securely supporting and retaining said body in position.

2. In an automobile, a chassis having longitudinally extending side bars, a body embracing said chassis and having its opposite side walls flat in a vertical direction, the lower edges of the opposite side walls of said body depending vertically for a distance below the lower faces of said side bars, and reinforcing and supporting brackets extending longitudinally of the inner faces of the opposite side walls of said body and secured thereto, said supporting brackets being secured to said chassis side bars and resting on and substantially contacting the top faces thereof throughout their length for supporting and retaining said body in position.

3. In an automobile, a chassis having side bars formed to provide flat outer faces, a body on said chassis and having vertically flat side walls depending for a distance exteriorly of and vertically below the lower faces of the side bars of said chassis, and supporting members secured to and extending along the inner faces of the side walls of said body and coextensive with the latter in parallel relation with respect to the lower edges thereof, said supporting members resting on the top faces of the side bars of said chassis throughout their length and secured thereto for retaining said body in position, the outer faces of said supporting members and said side bars mutually contacting the inner faces of the side walls of said body and reinforcing the same throughout their length.

4. In an automobile, a chassis having side bars formed to provide flat outer faces, a body on said chassis, and supporting members secured to and extending along the inner faces of the side walls of said body and coextensive with the latter in parallel relation with respect to the lower edges thereof, said supporting members resting on the top faces of the side bars of the chassis and contacting the same throughout their length, the outer faces of said supporting members being flush with the outer faces of the side bars of said chassis and acting in conjunction therewith to reinforce the side walls of said body, the latter being vertically flat and substantially contacting the outer faces of said supporting members and said side bars and depending for a distance vertically below the lower faces of the latter.

5. In an automobile, a chassis having side bars substantially U-shaped in cross-section and having their connecting walls forming outer vertical faces, a body on said chassis and including side walls arranged exteriorly of said side bars, and supporting members secured to and extending along the inner faces of the side walls of said body and coextensive with the latter in parallel relation with respect to the lower edges thereof, said supporting members resting on the top faces of the side bars of the chassis and substantially contacting the same throughout their length, the outer faces of said supporting members being flush with the outer faces of the side bars of said chassis and acting in conjunction therewith to reinforce the side walls of said body, the latter being substantially flat and contacting the outer faces of said supporting members and said side bars and depending for a distance below the lower faces of the latter.

6. In an automobile, a chassis having side bars, a body embracing said chassis and including side walls arranged exteriorly of said side bars and extending vertically below the same, a rear deck formed at one end of said body, reinforcing and supporting brackets including side members secured to and extending along the inner faces of the side wall of said body and coextensive with the latter in parallel relation with respect to the lower edges thereof and an intermediate member extending around said rear deck portion and connecting at opposite sides thereof with the adjacent ends of said side members, the latter resting on the top faces of the side bars of the chassis and substantially contacting the same throughout their length, the outer faces of said side members of said supporting brackets and said chassis side bars being arranged substantially in the same vertical plane and forming reinforcing abutments for the walls of said body.

7. In an automobile, a chassis having side bars, a body embracing said chassis and including side walls arranged exteriorly of and extending vertically below said side bars, a rear deck formed at one end of said body, supporting brackets including side members secured to and extending along the inner faces of the side walls of said body and coextensive with the latter in parallel relation with respect to the lower edges thereof and an intermediate member extending around said rear deck portion and connecting at opposite sides thereof with the adjacent ends of said side members, and an arched member disposed vertically of the deck portion and reinforcing the same and connecting at its opposite ends with said side members of said supporting brackets, said side members of the supporting brackets being directly superposed upon and secured to the said chassis side bars.

8. In an automobile, a chassis frame having longitudinally extending side bars, a body embracing said chassis frame and having the lower edges of the opposite side walls thereof arranged exteriorly of and depending for a distance below the lower faces of said side bars, reinforcing bars extending longitudinally of the inner faces of the opposite side walls of said body, and connecting means between said reinforcing bars and chassis side bars, whereby the walls of the body are reinforced and said body is arranged to overlap the chassis frame and suspended therefrom.

In testimony whereof, I affix my signature.

FREDERICK TRINCA.